Dec. 10, 1946.  E. BRAZITIS  2,412,492
WELDING ELECTRODE HOLDER
Filed Jan. 11, 1945
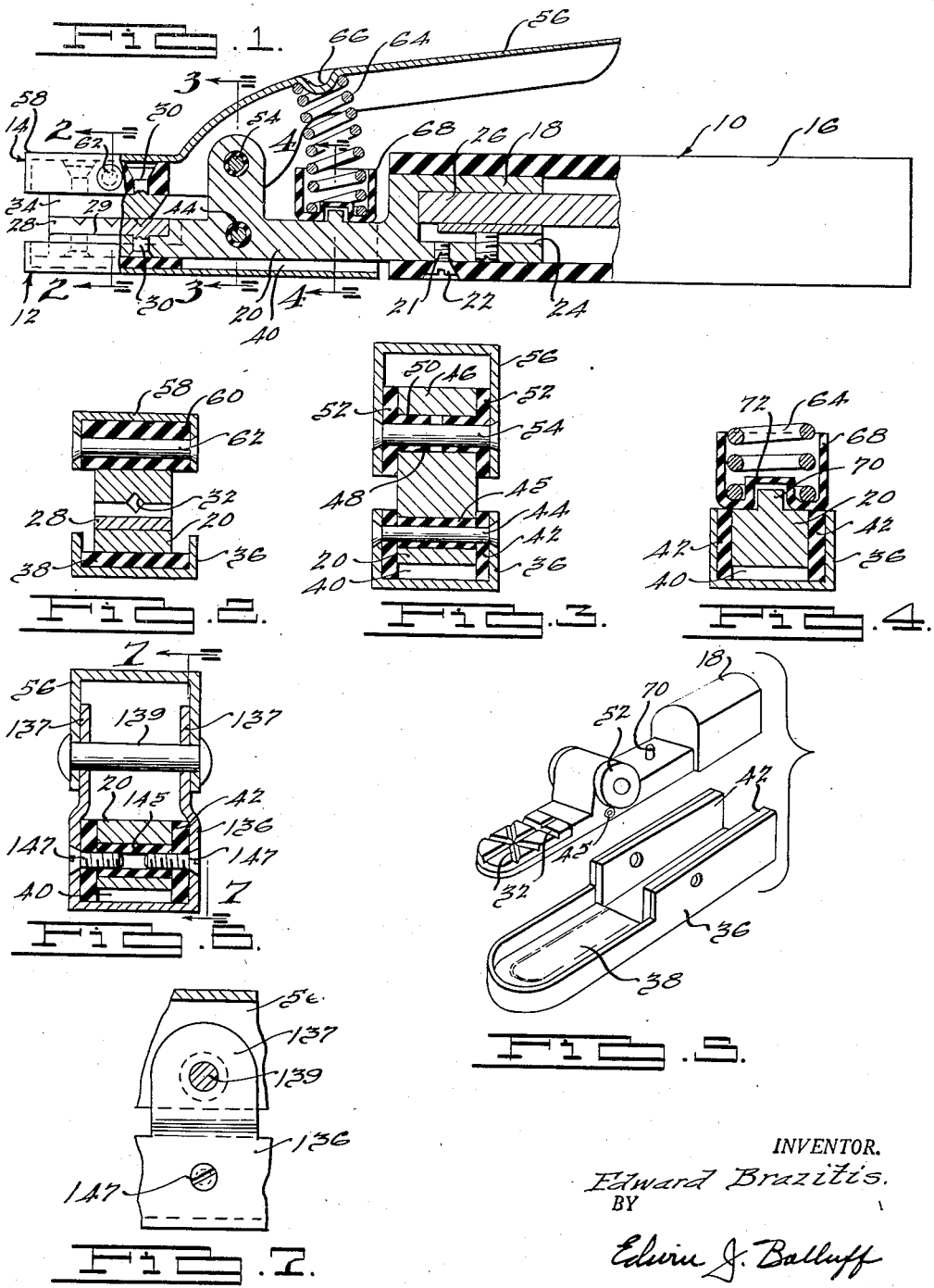
INVENTOR.
Edward Brazitis.
BY
Edwin J. Balluff
ATTORNEY.

Patented Dec. 10, 1946

2,412,492

UNITED STATES PATENT OFFICE 2,412,492

WELDING ELECTRODE HOLDER

Edward Brazitis, St. Clair Shores, Mich.

Application January 11, 1945, Serial No. 572,322

12 Claims. (Cl. 219—8)

This invention relates to welding electrode holders and has particular reference to certain new and useful improvements in the construction thereof by means of which the device is made more durable and more efficient in operation.

Principal objects of the invention are to provide:

A new and improved welding electrode holder;

A welding electrode holder which is constructed in such a manner so as to be durable and efficient in operation;

A welding electrode holder which is constructed and arranged so that parts which become defective may be readily replaced;

A welding electrode holder having metal shields covering the current conducting jaws and which shields are electrically insulated therefrom;

A welding electrode holder of the pivoted jaw type embodying the new and efficient pivotal connection which is constructed and arranged in such a way that current does not flow through such pivotal connection.

Other and further objects of the invention will be apparent from the following description and claims and will be understood by reference to the accompanying drawing, of which there is one sheet, which, by way of illustration, shows preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawing

Fig. 1 is a side elevational view, partially broken away, of a welding electrode holder embodying the invention;

Figs. 2, 3 and 4 are transverse sectional views taken in planes along the lines 2—2, 3—3, and 4—4 respectively of Fig. 1;

Fig. 5 is an exploded view on a reduced scale of the parts which form the lower jaw of the device as illustrated in Fig. 1;

Fig. 6 is a view corresponding with Fig. 3 but showing a modified form of pivot construction for the jaws; and Fig. 7 is a fragmentary side elevational view of the embodiment illustrated in Fig. 6 and taken along the staggered line 7—7 thereof.

Referring now to Figs. 1 to 5, there is illustrated a welding electrode holder comprising a handle 10 having a jaw 12 fixed thereto and a jaw 14 pivoted on and for movement relative to the jaw 12. The handle 10 may, as illustrated, comprise a hollow tubular member 16 of electrical non-conducting material open at both ends, one end of which provides a socket in which is fitted the enlarged end 18 of a jaw member 20. A screw 21 of electrical insulating material may be utilized to clamp the end 18 of the jaw member 20 in the end of the handle 10 and with the head 22 of the screw countersunk in an appropriate hole in a wall of the tubular member 16. The enlarged end 18 of the jaw member 20 is provided with a socket 24 for receiving the end 26 of a current conductor which extends through the tubular member 16 for supplying current to the jaw 12. The end 26 of the current conductor is appropriately arranged and clamped in the socket 24.

The jaw member 20 may comprise a metallic casting which projects from the end of the handle 10 and have a jaw element 28 removably secured by means of integral pins 30 to seat 29, the heads of which pins are peened over and countersunk in the under surface of the jaw member 20 at the forward end thereof. The jaw element 28 is securely clamped to the jaw member 20 and is provided with a plurality of transverse grooves 32 which cooperate with similar grooves 32 in the jaw element 34 of the other jaw 14 for holding a welding electrode therebetween.

A metal shield 36 of channel shaped cross section is mounted on the jaw member 20 and insulated therefrom by means of a strip 38 of insulating material which is arranged in the bottom of the shield 36 at the forward end thereof so as to insulate the forward end of the jaw member from the shield 36. The insulating strip 38, formed of suitable insulating material, functions as a spacer to space the shield 36 from the jaw member 20 so as to provide an air gap 40 therebetween. The shield 36 and the insulating strip 38 project forwardly a short distance of the jaw member 20 so as to provide an air gap between the front of the jaw member 20 and the jaw element 28 and the shield 36. The shield 36 further is cut away at its front and along the sides so as to provide adequate clearance for the electrode which will project from between the jaw elements 28 and 34.

The jaw member 20 is narrower in width than the shield 36 so as to accommodate insulating strips 42 between the side walls of the shield at the back thereof and the jaw member 20 for electrically insulating one from the other and so as to provide an air gap between the sides of the jaw member 20 and the shield 36 at the front thereof, as illustrated in Fig. 2.

The side walls of the shield 36, the insulating strips 42, and the jaw member 20 are provided with aligned holes, as illustrated in Fig. 3, for receiving a pin 44 which functions to retain the shield 36 and insulating strips 38 and 42 assembled to the jaw member 20. The hole through the jaw member 20 is larger than the pin 44 so as to accommodate an insulating bushing 45 through which the pin 44 extends for insulating the pin 44 from the member 20. The ends of the pin 44 may be headed and countersunk so as to be flush with the outer surface of the shield 36. In order to take apart this assembly it is only necessary to drill one of the heads of the pin 44, after which the pin may be knocked out of its place and the assembly may then be taken apart.

The jaw member 20 is provided with an upstanding boss 46 provided with a transverse hole 48 which is designed to accommodate hollow stems 50 of buttons or members 52 formed of insulating material. The buttons 52 form bearings for a pivot pin 54 which extends therethrough and through aligned holes provided in a release handle 56. The ends of the pin 54 are headed and countersunk in the walls of the release handle 56 so as to be flush therewith. The buttons 52 form part of the pivotal mounting for the jaw 14 on the jaw 12 and insulate the jaw 14, including its release handle 56, from the current conducting jaw member 20. The buttons 52 function as spacers between the projection 46 and the side walls of the release handle 56.

The release handle 56 is formed of metal and integrally with a shield 58 which houses and supports an insulating block or strip 60. A pin 62 extending through aligned holes in the shield 58 and the block 60 holds the same in operative relationship.

The metal jaw element 34 is removably secured to the insulating strip 60 by means of integral pins such as 30. The jaw 14, which includes the jaw element 34 and the release handle 56 and the shield 58, is normally retained in the position as illustrated in Fig. 1 by means of a coil spring 64 which is confined between a boss 66 on the handle 56 and a cup-shaped seat 68 of electrical nonconducting material which is seated on the jaw member 20 and the insulating strips 42 and located relative thereto by a locating pin 70 which cooperates with a locating socket 72 formed integrally with and in the bottom wall of the cup-shaped seat 68. By pressing the release handle 56 toward the handle 10, the jaw elements 28 and 34 may be separated for inserting an electrode between the jaw elements 34 and 28, or removing one therefrom. The reaction of the spring 64 on the insulating strips 42 also functions to hold the shield 36 in the position as illustrated relative to the jaw member 20.

In the embodiment of the invention illustrated in Figs. 6 and 7, the construction is the same except for the pivotal connection between the jaw member 20 and the release handle 56 and shield 58 and the means for assembling the lower jaw and shield. The release handle 56 and shield 58, as well as the other parts of the jaw 14, in this embodiment are exactly of the same construction as those illustrated in the previous embodiment.

In this embodiment, however, the projection 46 is omitted and in lieu thereof the shield 136, corresponding with the shield 36, is provided with ears 137 offset inwardly and overlapping the sides of the release handle 56. A pivot pin 139 extending through aligned holes in the ears 137 and headed forms the pivotal connection between the jaw members 12 and 14. Jaw member 20 has a hole therethrough in which insulating bushing 145 is arranged. Screws 147, the heads of which are countersunk in aligned openings in shield 136, threadedly engage bushing 145 to retain the shield 136 and insulating strips assembled to the jaw member 20. Since the shield 136 is insulated from the jaw member 20, it is apparent that there is no electrical path through the pivotal connection. The construction of the jaw 12 is, except in the foregoing particulars, the same as that illustrated in the previous embodiment, and for this reason the same reference characters have been used to indicate corresponding parts.

While I have illustrated and described preferred embodiments of my invention, it is understood that these are capable of modification, and I therefore do not wish to be limited to the precise details set forth but desire to avail myself of such changes and alterations which fall within the purview of the following claims.

I claim:

1. In a welding electrode holder, a current conducting member having a current conducting cable directly attached thereto and terminating with a clamping jaw, electrical insulating material at least partially covering said current conducting member, a metallic channel member at least partially covering said electrical insulating material, a bushing of electrical insulating material recessed in said current conducting member and forming a part of a fastening means for securing together said metallic channel member, said electrical insulating material and said current conducting member, said fastening means being constructed and arranged so as not to form an electrical path from said current conducting member to said metallic channel member.

2. In a welding electrode holder, a current conducting member terminating with a clamping jaw, electrical insulating material covering at least part of said current conducting member, a metallic channel member covering at least part of said electrical insulating material and insulated thereby from said current conducting member, said electrical insulating material being constructed and arranged to form an air gap between a portion of said current conducting member and a portion of the legs of said metallic channel member, said legs extending beyond the surface of said electrical insulating material, said air gap providing a means of improved ventilation, and fastening means securing said channel member and insulating material to said current conducting member in such a manner so as not to form an electrical path between said current conducting member and said channel member.

3. In a welding electrode holder, a current conducting member provided with a clamping jaw, electrical insulating material covering at least part of said current conducting member, a metallic channel-shaped shield covering at least part of said electrical insulating material and insulated thereby from said current conducting member, said electrical insulating material being constructed and arranged relative to said current conducting member to form an air gap between said current conducting member and a portion of the web of said shield, said air gap providing a means of improved ventilation.

4. In a welding electrode holder, a current conducting member terminating with a clamping jaw, electrical insulating material covering at least part of said current conducting member, a metallic channel member covering at least part of said electrical insulating material, said electrical insulating material being shaped to extend beyond the sides of said current conducting member to thereby create an air gap between a portion of said current conducting member and a portion of said metallic channel member, said air gap providing a means of improved ventilation.

5. In an arc welding electrode holder, a single current conducting member having a current conducting cable directly attached thereto and terminating with a clamping jaw, a tubular handle of insulating material to which said current conducting member is removably secured, a metallic channel member secured to and insulated from said current conducting member, a movable lever terminating with a clamping jaw, a pivot for movably fastening said movable lever to said current conducting member to provide for separating the jaws of the holder, and electrical insulating material associated with said pivot for breaking the electrical path from said current conducting member to said movable lever so that the current does not flow through said pivot.

6. In an arc welding electrode holder, a current conducting member having a current conducting cable directly attached thereto and provided with a clamping jaw, a tubular handle of insulating material to which said current conducting member is removably secured, a movable lever terminating with a clamping jaw, each of said clamping jaws having secured thereto and insulated therefrom a metallic shield, said movable lever and said current conducting member being provided with a pivotal connection therebetween providing for separating the jaws of the holder, and electrical insulating material associated with said pivotal connection for breaking the electrical path from said current conducting member through said pivotal connection so that current does not flow through said pivotal connection.

7. In an arc welding electrode holder, a current conducting member having a current conducting cable directly attached thereto and terminating with a clamping jaw, said current conducting member being removably secured to a tubular handle of insulating material, a metallic shield secured to and insulated from said current conducting member, a movable lever terminating with a clamping jaw, said movable lever having a pivotal connection with said current conducting member thereby providing for separating the jaws of the holder, and electrical insulating material associated with said pivot for breaking the electrical path from said current conducting member through said pivotal connection to said movable lever so that current does not flow through said pivotal connection.

8. In a welding electrode holder, a current conducting member terminating with a clamping jaw, said current conducting member being removably secured to a tubular handle of insulating material, an electrical connection from a source of current secured to said current conducting member, said electrical connection being enclosed within said tubular handle of insulating material, a metallic channel member secured to and insulated from said current conducting member, a movable lever terminating with a clamping jaw, said movable lever being pivotally fastened to said metallic channel member thereby providing for actuating the jaws of the holder, said movable lever not having an electrical path from said current conducting member or the jaws of the holder.

9. In a welding electrode holder, a current conducting member provided with a clamping jaw, a tubular handle of insulating material to which said current conducting member is removably secured, and through which an electrical connection from a source of current extends to said current conducting member, a metallic shield secured to and insulated and spaced from said current conducting member to provide an air gap therebetween, a movable lever terminating with a clamping jaw and pivotally fastened to said shield thereby providing for actuating the jaws of the holder, said movable lever not having an electrical path from said current conducting member or the jaws of the holder.

10. In an arc welding electrode holder, a current conducting member having a current conducting cable directly attached thereto and provided with a clamping jaw, electrical insulating material covering at least part of said current conducting member, a metallic shield covering at least part of said electrical insulating material, a bushing of electrical insulating material recessed in said current conducting member and forming a part of fastening means to secure together said metallic channel member, said electrical insulating material and said current conducting member, said fastening means not providing an electrical path from said current conducting member to said shield and including pin means passing through said shield and insulating material and engaging said bushing.

11. In a welding electrode holder, a current conducting member provided with a clamping jaw, strips of electrical insulating material covering part of said current conducting member, a metallic channel member receiving said electrical insulating material and said current conducting member, said electrical insulating material extending beyond the sides of said current conducting member to create an air gap between said current conducting member and a portion of the legs of said metallic channel member, said legs extending beyond the surface of said electrical insulating material, said air gap providing a means of improved ventilation, a second clamping jaw pivotally associated and cooperable with the aforesaid clamping jaw for holding an electrode, and spring means between said second jaw and said insulating material for biasing said jaws together.

12. A welding electrode holder according to the construction defined in claim 1 wherein said fastening means further includes pin means having stems within said bushing and heads clamping against the sides of said channel members.

EDWARD BRAZITIS.